United States Patent
Saeki et al.

(10) Patent No.: US 10,181,741 B2
(45) Date of Patent: Jan. 15, 2019

(54) STORAGE BATTERY DEVICE

(71) Applicant: Panasonic Intellectual Property Management Co., Ltd., Osaka (JP)

(72) Inventors: Takeshi Saeki, Osaka (JP); Yoshiharu Takemori, Nara (JP); Daichi Enomoto, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 493 days.

(21) Appl. No.: 14/631,339

(22) Filed: Feb. 25, 2015

(65) Prior Publication Data

US 2015/0171639 A1    Jun. 18, 2015

Related U.S. Application Data

(63) Continuation of application No. PCT/JP2013/004379, filed on Jul. 18, 2013.

(30) Foreign Application Priority Data

Jan. 24, 2013   (JP) ................................ 2013-011010

(51) Int. Cl.
*H02J 50/00*        (2016.01)
*H02J 7/00*         (2006.01)
(Continued)

(52) U.S. Cl.
CPC .............. *H02J 7/007* (2013.01); *G01K 13/00* (2013.01); *H01M 10/44* (2013.01);
(Continued)

(58) Field of Classification Search
CPC .. H02J 7/055; H02J 2007/0037; H02J 7/0052; H02J 7/025; H02J 17/00;
(Continued)

(56) References Cited

U.S. PATENT DOCUMENTS

| | | | |
|---|---|---|---|
| 2008/0061733 A1* | 3/2008 | Toya ...................... | H02J 7/025 320/103 |
| 2010/0156343 A1* | 6/2010 | Jung ...................... | H02J 7/025 320/108 |

(Continued)

FOREIGN PATENT DOCUMENTS

| | | |
|---|---|---|
| JP | 11-191435 A | 7/1999 |
| JP | 2005-245078 A | 9/2005 |

(Continued)

OTHER PUBLICATIONS

International Search Report for corresponding International Application No. PCT/JP2013/004379 dated Sep. 3, 2013.

*Primary Examiner* — Drew A Dunn
*Assistant Examiner* — Michael Dibenedetto
(74) *Attorney, Agent, or Firm* — Renner, Otto, Boisselle & Sklar, LLP

(57) ABSTRACT

A storage battery device according to the present disclosure includes a storage unit accumulating charge, an attachment unit attachable to an electronic device, and a controller charging the storage unit by a first current value when the storage battery device is attached to the electronic device via the attachment unit, and charging the storage unit by a second current value lower than the first current value when the storage battery device is not attached to the electronic device via the attachment unit.

6 Claims, 5 Drawing Sheets

(51) Int. Cl.
*H02J 50/10* (2016.01)
*G01K 13/00* (2006.01)
*H02J 7/02* (2016.01)
*H01M 10/44* (2006.01)
*H01M 10/48* (2006.01)
*H02J 7/04* (2006.01)

(52) U.S. Cl.
CPC ....... *H01M 10/443* (2013.01); *H01M 10/486* (2013.01); *H02J 7/0068* (2013.01); *H02J 7/025* (2013.01); *H02J 50/10* (2016.02); *H02J 7/04* (2013.01); *H02J 2007/0098* (2013.01)

(58) Field of Classification Search
CPC .. H02J 50/10; H02J 50/12; H02J 50/40; H02J 50/50; H02J 50/60; H02J 50/70; H02J 50/80; H02J 50/90; H02J 7/04; H02J 7/007; H02J 2007/0068; H02J 2007/0098; G01K 13/00; H01M 10/44; H01M 10/443
USPC ....................................................... 320/108
See application file for complete search history.

(56) References Cited

U.S. PATENT DOCUMENTS

| | | | | |
|---|---|---|---|---|
| 2010/0207771 | A1* | 8/2010 | Trigiani | B60L 11/1816 340/636.1 |
| 2011/0156636 | A1* | 6/2011 | Kim | H02J 7/0055 320/108 |
| 2011/0285349 | A1* | 11/2011 | Widmer | B60L 11/182 320/108 |
| 2014/0070761 | A1* | 3/2014 | Labbe | A61N 1/378 320/108 |

FOREIGN PATENT DOCUMENTS

| | | |
|---|---|---|
| JP | 2011-083067 A | 4/2011 |
| JP | 2011-125137 A | 6/2011 |
| JP | 2011-250644 A | 12/2011 |
| JP | 2012-153277 A | 8/2012 |
| WO | WO 2009/031639 A1 | 3/2009 |

* cited by examiner

STORAGE BATTERY DEVICE

BACKGROUND

1. Field

The present disclosure relates to a storage battery device.

2. Description of the Related Art

Unexamined Japanese Patent Publication No. 2011-125137 discloses a battery charger. The battery charger disclosed in Unexamined Japanese Patent Publication No. 2011-125137 includes a plurality of primary coils, and a detector. The primary coils electromagnetically connect with a secondary coil provided on an electronic device, and charge the secondary coil provided on the electronic device by utilizing electromagnetic induction. The detector detects electronic device information including where the electronic device is carried, and the shape and weight of the electronic device.

According to the battery charger disclosed in Unexamined Japanese Patent Publication No. 2011-125137, the battery charger immediately recognizes the presence of an electronic device which is being carried. Furthermore, the battery charger can handle a plurality of electronic devices.

SUMMARY

A storage battery device according to the present disclosure includes: a storage unit accumulating charge; an attachment unit attachable to an electronic device; and a controller charging the storage unit by a first current value when the storage battery device is attached to the electronic device via the attachment unit, and charging the storage unit by a second current value lower than the first current value when the storage battery device is not attached to the electronic device via the attachment unit.

DETAILED DESCRIPTION

Exemplary embodiments are hereinafter described in detail with reference to the drawings. However, excessively detailed description may be omitted depending on circumstances. For example, detailed description of well-known matters, and repetitive description of substantially equivalent configuration may be omitted. This omission is made so as to avoid excessive redundancy of the following description, and help those skilled in the art to easily understand the following description.

The accompanying drawings and the following description provided by the present inventor(s) are aimed at helping those skilled in the art to sufficiently understand the present disclosure. It is therefore not intended that the scope of the subject matters as claimed in the appended claims is limited in any way to the drawings and description presented herein.

First Exemplary Embodiment

A system according to a first exemplary embodiment is hereinafter described with reference to the drawings.

[1. Outline]

Figure 1:
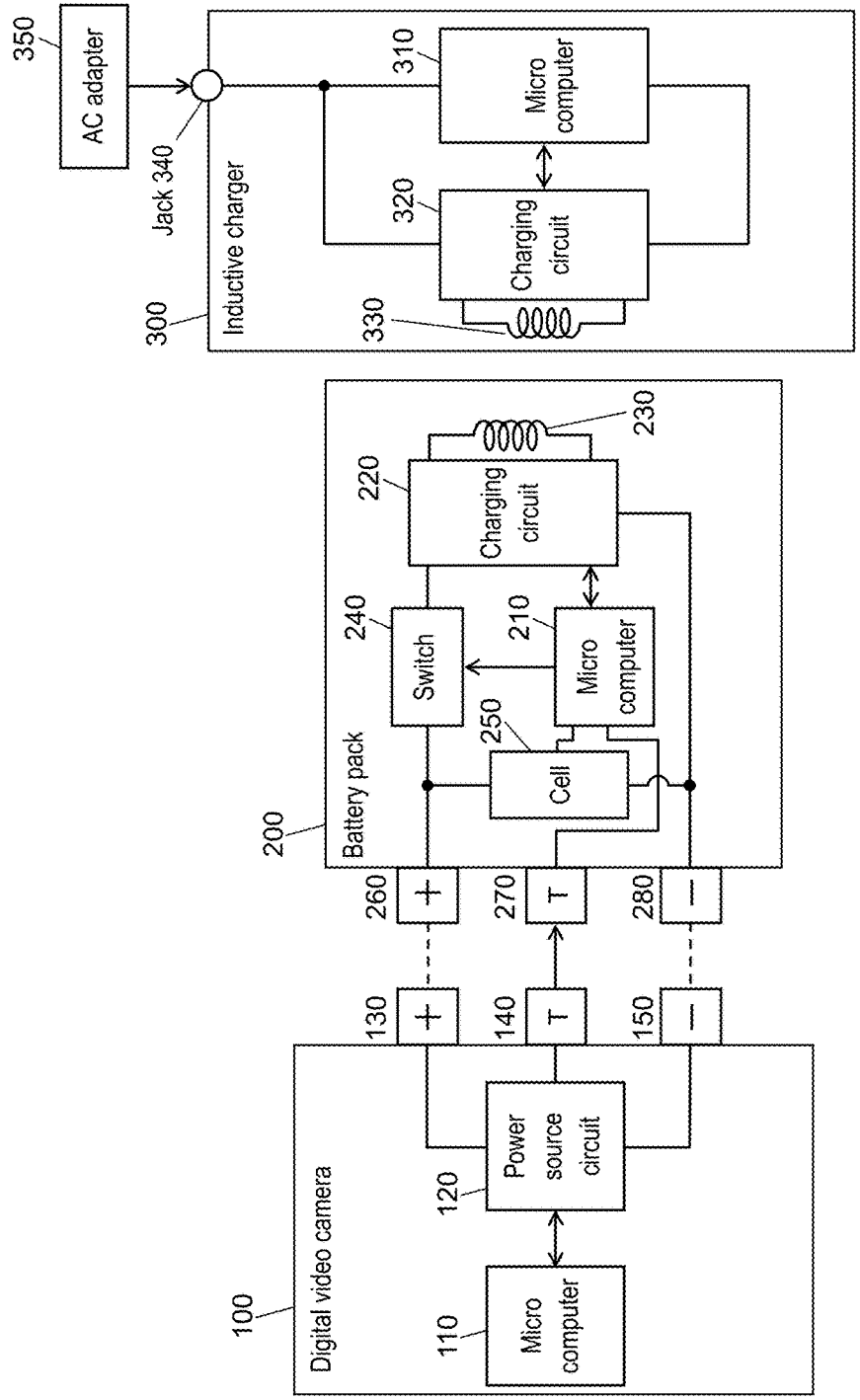
FIG. 1 is a block diagram showing electric structures of respective devices constituting a system.

The outline of the system according to this exemplary embodiment is described with reference to FIG. 1. FIG. 1 is a block diagram showing electric structures of respective devices constituting the system according to this exemplary embodiment.

The system according to this exemplary embodiment includes digital video camera 100, battery pack 200, and inductive charger 300. According to this system, battery pack 200 is charged either in a condition in which battery pack 200 and digital video camera 100 are connected, or in a condition in which battery pack 200 is disconnected from digital video camera 100.

When battery pack 200 is charged in the condition in which battery pack 200 and digital video camera 100 are connected, a user often holds a part of digital video camera 100 at the time of stop of charging of battery pack 200. On the other hand, when battery pack 200 is charged in the condition in which battery pack 200 is disconnected from digital video camera 100, the user holds a part of battery pack 200 at the time of the stop of charging of battery pack 200.

When battery pack 200 is rapidly charged by supply of current having a high current value, a temperature of battery pack 200 increases to a high temperature in comparison with a case where battery pack 200 is charged by supply of current having a low current value. It is not preferable that the part of the device to be held by the user has an excessively high temperature.

For overcoming this problem, battery pack 200 includes a structure constituted by battery cell 250, positive terminal 260, T terminal 270, and negative terminal 280, and a structure constituted by microcomputer 210, charging circuit 220, charging coil 230, and switch 240. Battery cell 250 accumulates charge. The structure constituted by positive terminal 260, T terminal 270, and negative terminal 280 is attachable to digital video camera 100. The structure constituted by microcomputer 210, charging circuit 220, charging coil 230, and switch 240 charges battery cell 250 by a first current value in a predetermined period of the period for charging battery cell 250 when battery pack 200 is attached to digital video camera 100 via the structure constituted by positive terminal 260, T terminal 270, and negative terminal 280. On the other hand, the structure constituted by microcomputer 210, charging circuit 220, charging coil 230, and switch 240 charges battery cell 250 by a second current value lower than the first current value when battery pack 200 is not attached to digital video camera 100 via the structure constituted by positive terminal 260, T terminal 270, and negative terminal 280.

Accordingly, battery pack 200 can charge battery cell 250 positioned inside battery pack 200 at a relatively high speed without excessively increasing the temperature of the part often held by the user.

The configuration, operation, effects and the like of the system according to this exemplary embodiment are hereinafter sequentially described.

[2. Electric Configurations of Respective Devices Constituting System]

The electric configurations of the respective devices constituting the system according to this exemplary embodiment are described with reference to FIG. 1. As described above, this system includes digital video camera 100, battery pack 200 attachable to digital video camera 100, and inductive charger 300 on which battery pack 200 or the like is carried.

Digital video camera 100 includes microcomputer 110, power source circuit 120, positive terminal 130, T terminal 140, and negative terminal 150. Microcomputer 110 is an arithmetic circuit which controls the general operation of digital video camera 100. Microcomputer 110 is electrically connected with power source circuit 120.

Power source circuit 120 is a circuit which transforms voltage applied by battery pack 200 into voltage necessary for normal operation of the respective parts constituting digital video camera 100. Power source circuit 120 supplies current to the respective components included in digital video camera 100 by applying the transformed voltage. For example, it is assumed herein that the voltage necessary for normal operation of microcomputer 110 is 3 (V) when 4 (V) is applied to power source circuit 120 by battery pack 200. In this case, power source circuit 120 transforms the voltage of 4 (V) applied by battery pack 200 into 3 (V), and applies 3 (V) to microcomputer 110.

Positive terminal 130 is a terminal corresponding to an entrance for current introduced from battery pack 200. Negative terminal 150 is a terminal corresponding to an exit for current introduced from battery pack 200. More specifically, when digital video camera 100 operates under the voltage applied by battery pack 200, flow of current is directed from positive terminal 130 to negative terminal 150.

T terminal 140 is a terminal for detecting the temperature of battery cell 250. When battery pack 200 is attached to digital video camera 100, voltage having a predetermined voltage value is applied to T terminal 140 by power source circuit 120. Microcomputer 110 calculates the resistance value of a not-shown thermistor connected with T terminal 270 by detecting the current value of current flowing from T terminal 140 to T terminal 270, and estimates the temperature of battery cell 250 based on the calculated resistance value.

Although not shown in FIG. 1, digital video camera 100 includes an optical system, an image sensor, and a monitor. The respective components operate by receiving supply of current from power source circuit 120. The respective structures operate based on control instructions issued from microcomputer 110. Battery pack 200 includes microcomputer 210, charging circuit 220, charging coil 230, switch 240, battery cell 250, positive terminal 260, T terminal 270, and negative terminal 280. Microcomputer 210 is an arithmetic circuit that controls entire battery pack 200. Microcomputer 210 is electrically connected with charging circuit 220, switch 240, T terminal 270 and the like. Charging circuit 220 is a circuit which rectifies current supplied from charging coil 230. Charging circuit 220 receives instructions concerning a current value from microcomputer 210, and supplies to switch 240 current having a current value in correspondence with the instructions. Charging coil 230 is a coil which supplies current produced by electromagnetic induction.

Switch 240 is a circuit which switches between a conductive state and a non-conductive state. Switch 240 receives instructions from microcomputer 210 whether to enter the conductive state or to enter the non-conductive state. Upon reception of instructions to enter the conductive state, switch 240 allows flow of current supplied from charging circuit 220. On the other hand, upon reception of instructions to enter the non-conductive state, switch 240 does not allow flow of current supplied from charging circuit 220.

Battery cell 250 is a rechargeable battery for accumulating charge generated by supply of current from charging circuit 220. Battery cell 250 is allowed to accumulate charge to the maximum capacity by supply of current from charging circuit 220. Battery cell 250 supplies current generated by the accumulated charge to digital video camera 100.

Positive terminal 260 is a terminal electrically connected with positive terminal 130. Negative terminal 280 is a terminal electrically connected with negative terminal 150.

T terminal 270 is a terminal electrically connected with T terminal 140. T terminal 270 is connected with a thermistor whose resistance value is variable in accordance with the temperature condition of battery cell 250. As described above, microcomputer 110 calculates the resistance value of the thermistor by detecting the current value flowing in T terminal 270, and estimates the temperature of battery cell 250. Microcomputer 210 detects whether or not battery pack 200 is attached to digital video camera 100 by detecting the voltage value applied to T terminal 270. When battery pack 200 is attached to digital video camera 100, the foregoing voltage having the predetermined voltage value and applied to T terminal 140 is applied to T terminal 270. When battery pack 200 is not attached to digital video camera 100, the voltage having the predetermined voltage value and applied to T terminal 140 is not applied to T terminal 270. Accordingly, whether or not battery pack 200 is attached to digital video camera 100 can be determined by microcomputer 210 based on the detection of whether or not the voltage value of the voltage applied to T terminal 270 is the predetermined voltage value of the voltage applied to T terminal 140.

Inductive charger 300 includes microcomputer 310, charging circuit 320, charging coil 330, and jack 340. Microcomputer 310 is an arithmetic circuit that controls entire inductive charger 300. Charging circuit 320 is a circuit that controls the current value of current supplied from AC adapter 350, for example. Charging circuit 320 supplies current received from AC adapter 350 to charging coil 330. Charging circuit 320 supplies to charging coil 330 current having the current value in correspondence with instructions from microcomputer 310. Charging coil 330 is a coil connected with charging circuit 320. Charging coil 330 generates a magnetic field when receiving current supplied from charging circuit 320 flows in charging coil 330. When battery pack 200 is carried on inductive charger 300 in such a position that charging coil 230 faces charging coil 330, electromagnetic induction is produced by the effect of the magnetic field generated by charging coil 330. As a result, current starts to flow in charging coil 230. Jack 340 is a terminal connected with AC adapter 350. Charging circuit 320 receives supply of current from AC adapter 350 via jack 340.

[3. Charging Operation]

Figure 2:
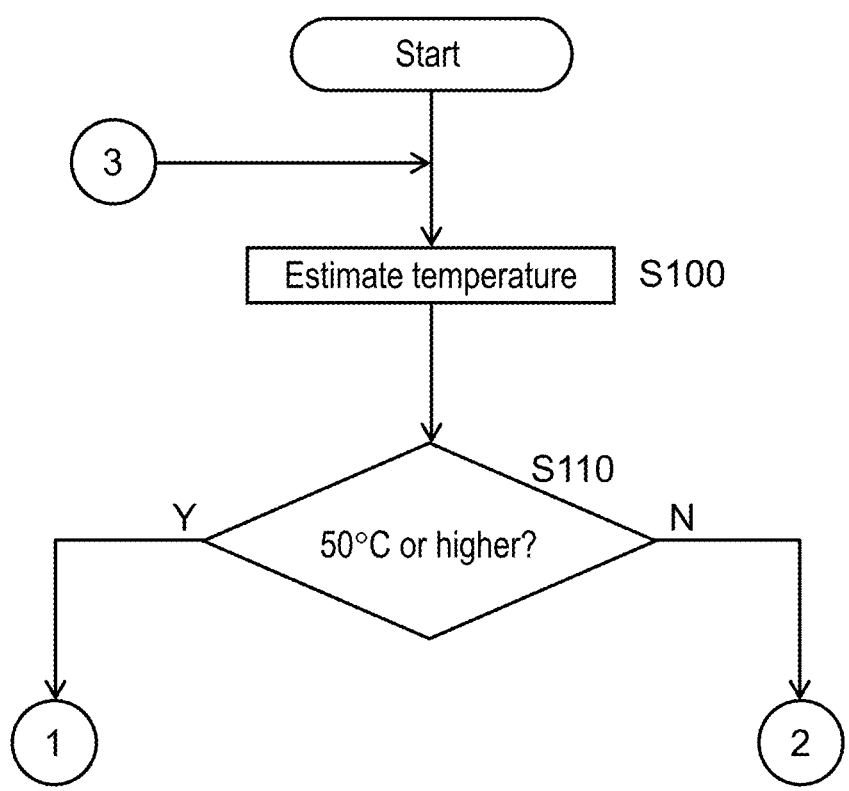
FIG. 2 is a flowchart describing a part of a charging operation.
Figure 3:
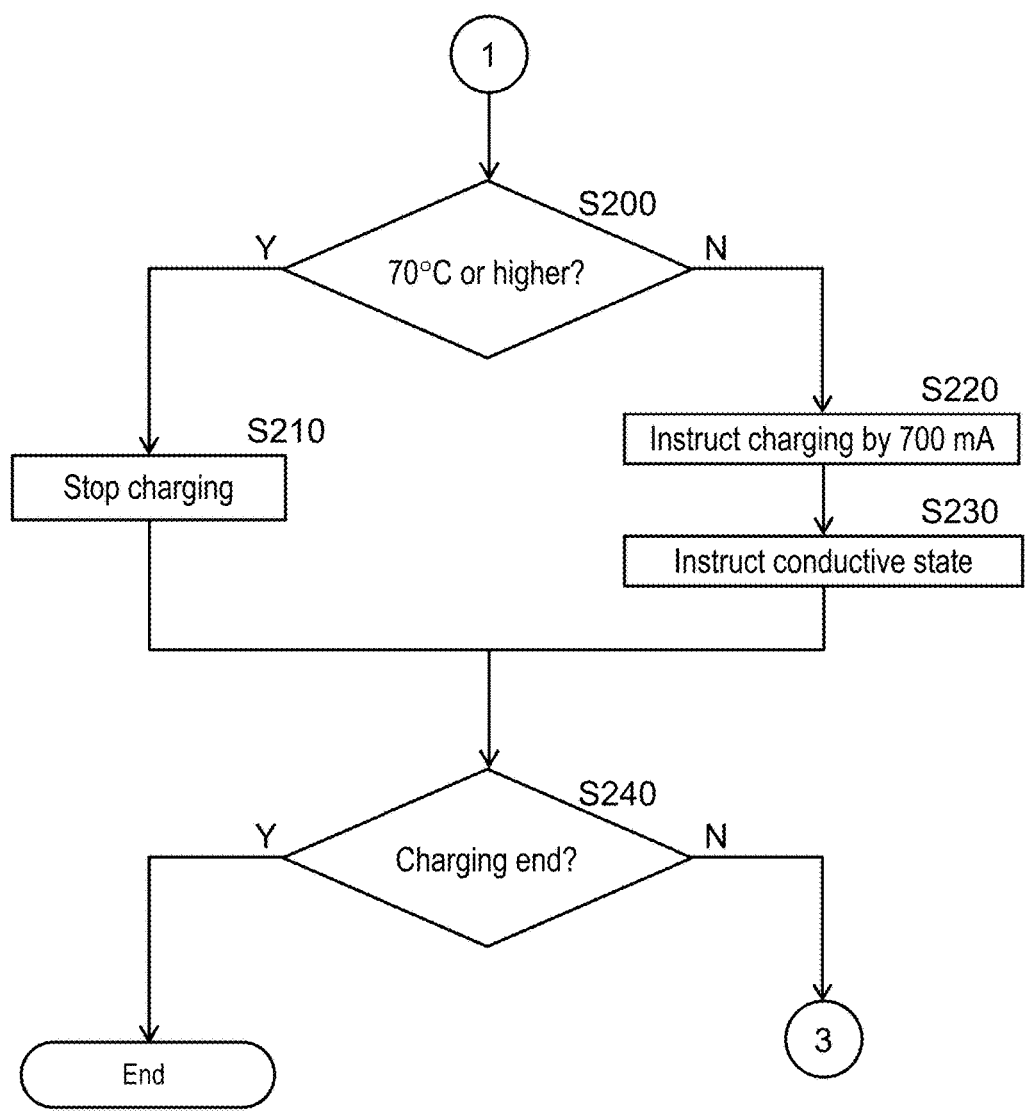
FIG. 3 is a flowchart describing a part of the charging operation.
Figure 4:
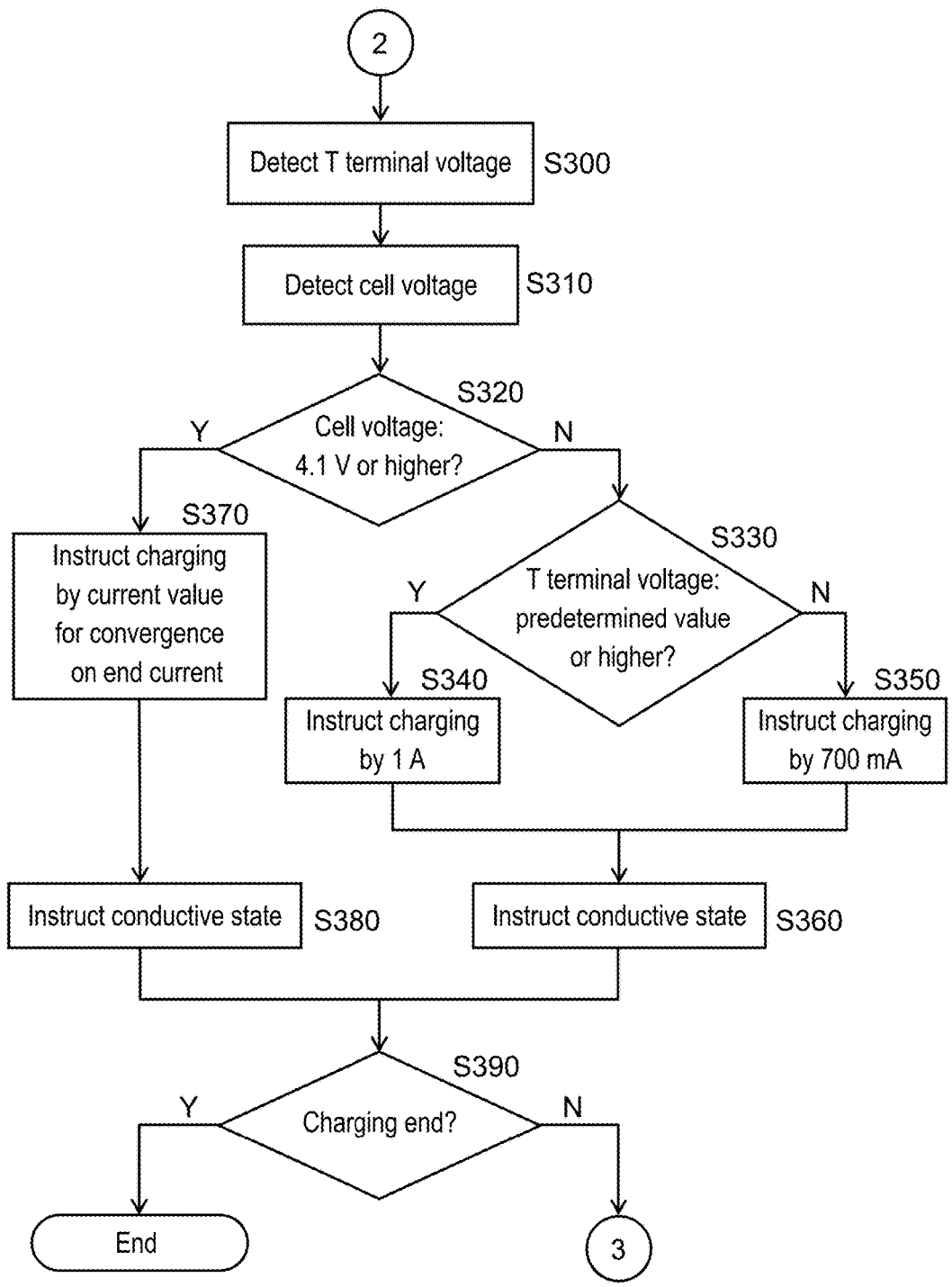
FIG. 4 is a flowchart describing a part of the charging operation.
Figure 5A:
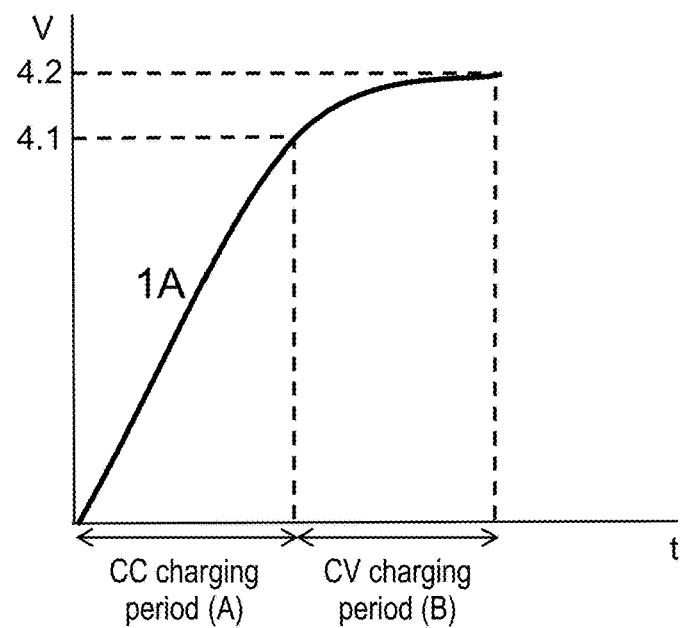
FIG. 5A is a schematic view describing a change of voltage caused by the charging operation.
Figure 5B:
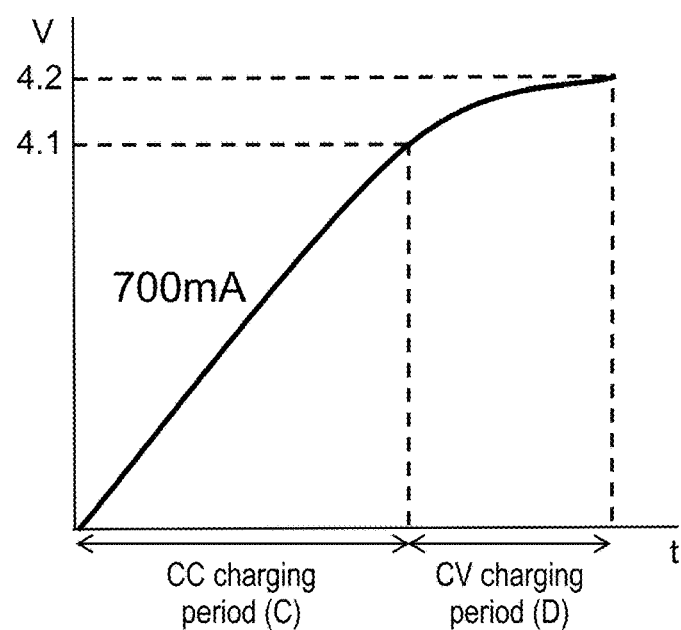
FIG. 5B is a schematic view describing a change of voltage caused by the charging operation.

A charging operation for battery pack 200 performed by the system according to this exemplary embodiment is hereinafter described with reference to FIGS. 2 to 5B. FIGS. 2 to 4 are flowcharts describing a part of the charging operation for battery pack 200. FIGS. 5A and 5B are schematic views each describing a change of voltage caused by the charging operation for battery pack 200. It is assumed herein that AC adapter 350 is connected with jack 340 of inductive charger 300. It is also assumed that current flows in charging coil 330, and generates a magnetic field around charging coil 330.

When battery pack 200 is carried on inductive charger 300, electromagnetic induction is produced in charging coil 230. As a result, current starts to flow in charging coil 230, whereby microcomputer 210 receives supply of current. Consequently, microcomputer 210 is activated, and the charging operation for battery pack 200 is started.

After activation, microcomputer 210 estimates the temperature of battery cell 250 by detecting the current value of current flowing in T terminal 270 (S100). After estimation of the temperature, microcomputer 210 determines whether or not the estimated temperature is 50 (° C.) or higher (S110).

When it is determined that the temperature is 50 (° C.) or higher, the control performed by microcomputer 210 shifts to "1", and enters the flowchart shown in FIG. 3. In this case, microcomputer 210 determines whether or not the estimated temperature is 70 (° C.) or higher (S200). When it is determined that the estimated temperature is 70 (° C.) or higher, microcomputer 210 controls charging circuit 220 and switch 240 to stop charging of battery cell 250 (S210). When it is determined that the estimated temperature is lower than 70 (° C.), microcomputer 210 controls charging circuit 220 to supply current of 700 (mA) (S220). Then, microcomputer 210 controls switch 240 to enter the conductive state to allow flow of current supplied from charging circuit 220 (S230).

After the stop of charging of battery cell 250 in step S210, or after switch 240 enters the conductive state in step S230, microcomputer 210 determines whether or not charging of battery cell 250 is completed (S240). When it is determined that charging is completed, microcomputer 210 ends the charging operation. On the other hand, when it is determined that charging is not completed, microcomputer 210 shifts to "3", and repeats the control from step S100 in FIG. 2.

On the other hand, when the estimated temperature of battery cell 250 is lower than 50 (° C.) in step S110 in FIG. 2, the control performed by microcomputer 210 shifts to "2", and enters the flowchart shown in FIG. 4. In this case, microcomputer 210 detects voltage applied to T terminal 270 (S300). Then, microcomputer 210 detects voltage applied to battery cell 250 (S310).

After detection of the voltage applied to battery cell 250, microcomputer 210 determines whether or not the voltage applied to battery cell 250 is 4.1 (V) or higher (S320).

When it is determined that the voltage applied to battery cell 250 is lower than 4.1 (V), microcomputer 210 determines whether or not the voltage value of the voltage applied to T terminal 270 is a predetermined voltage value or higher (S330). The predetermined voltage value in this context refers to a value set by a designer in accordance with the voltage value which can be supplied by power source circuit 120 of digital video camera 100.

When it is determined that the voltage value of the voltage applied to T terminal 270 is the predetermined voltage value or higher, microcomputer 210 controls charging circuit 220 to supply current of 1 (A) (S340). More specifically, microcomputer 210 charges battery cell 250 by a constant current value of 1 (A) until the voltage value of battery cell 250 reaches 4.1 (V) as shown in FIG. 5A. Here, the period for charging battery cell 250 by current having the constant current value until the voltage value reaches 4.1 (V) is referred to as a CC (Constant Current) charging period.

On the other hand, when it is determined in step S330 that the voltage value of the voltage applied to T terminal 270 is lower than the predetermined voltage value, microcomputer 210 controls charging circuit 220 to supply current of 700 (mA) (S350). More specifically, microcomputer 210 charges battery cell 250 by the constant current of 700 (mA) until the voltage value of battery cell 250 reaches 4.1 (V) as shown in FIG. 5B. In this case, CC charging period (C) in FIG. 5B is longer than CC charging period (A) in FIG. 5A. In other words, it can be seen that charging of battery pack 200 by supply of current of 1 (A) is completed more rapidly than charging of battery pack 200 by supply of current of 700 (mA).

After charging circuit 220 is controlled to supply current of 1 (A) in step S340, or after charging circuit 220 is controlled to supply current of 700 (mA) in step S350, microcomputer 210 controls switch 240 to enter the conductive state to allow flow of current supplied from charging circuit 220 (S360).

On the other hand, when it is determined that the voltage value applied to battery cell 250 is 4.1 (V) or higher in step S320, microcomputer 210 controls charging circuit 220 to supply such a current value as to converge the voltage value applied to battery cell 250 on 4.2 (V) (S370). More specifically, microcomputer 210 controls charging circuit 220 to supply such current as to produce a change of the voltage value along a curve shown in CV (Constant Voltage) charging period (B) in FIG. 5A and a curve shown in CV charging period (D) in FIG. 5B. The curve shown in CV charging period (B) in FIG. 5A and the curve shown in CV charging period (D) in FIG. 5B agree with each other. This is because the current value of the current flowing in CV charging period (B) is equivalent to the current value of the current flowing in CV charging period (D). The CV charging period herein may be also defined as a period for charging battery cell 250 by a variable current value in such a manner as to keep a voltage of battery cell 250 constant.

After completion of the process in step S370, microcomputer 210 controls switch 240 to enter the conductive state to allow flow of current supplied from charging circuit 220 (S380).

After switch 240 is controlled to enter the conductive state to allow flow of current supplied from charging circuit 220 in step S360 or step S380, microcomputer 210 determines whether or not charging of battery cell 250 is completed (S390). When it is determined that charging is completed, microcomputer 210 ends the charging operation. On the other hand, when it is determined that charging is not completed, microcomputer 210 shifts to "3", and the control from step S100 in FIG. 2 is repeated.

[4. Effects and the Like]

As described above, battery pack 200 according to this exemplary embodiment includes a structure constituted by battery cell 250, positive terminal 260, T terminal 270, and negative terminal 280, and a structure constituted by microcomputer 210, charging circuit 220, charging coil 230, and switch 240. Battery cell 250 accumulates charge. The structure constituted by positive terminal 260, T terminal 270, and negative terminal 280 is attachable to digital video camera 100. The structure constituted by microcomputer 210, charging circuit 220, charging coil 230, and switch 240 charges battery cell 250 by the first current value for a part of the period for charging battery cell 250 when battery pack 200 is attached to digital video camera 100 via the structure constituted by positive terminal 260, T terminal 270, and negative terminal 280. On the other hand, the structure constituted by microcomputer 210, charging circuit 220, charging coil 230, and switch 240 charges battery cell 250 by the second current value lower than the first current value when battery pack 200 is not attached to digital video camera 100 via the structure constituted by positive terminal 260, T terminal 270, and negative terminal 280.

Accordingly, charging of battery cell 250 is rapidly completed by supply of current having a high current value, when the probability is low that battery pack 200 is directly touched by the user, such as the case where battery pack 200 is attached to digital video camera 100. On the other hand, charging of battery cell 250 is completed by supply of current having a low current value without excessively increasing the temperature of battery pack 200, when the probability is high that battery pack 200 is directly touched by the user, such as the case where battery pack 200 is not attached to digital video camera 100. In this case, battery pack 200 can charge battery cell 250 positioned inside battery pack 200 at a relatively high speed without excessively increasing the temperature of the part to be held by the user. Moreover, battery pack 200 according to this exemplary embodiment further includes microcomputer 210 which detects the temperature of battery cell 250. When the temperature of battery cell 250 is higher than a predetermined temperature, the structure constituted by microcomputer 210, charging circuit 220, charging coil 230, and switch 240 charges battery cell 250 by a current value lower than the first current value, or does not charge battery cell 250 regardless of whether or not battery pack 200 is attached to digital video camera 100 via the structure constituted by positive terminal 260, T terminal 270, and negative terminal 280. More specifically, when microcomputer 210 determines that the temperature of battery cell 250 is 50 (° C.) or higher in step S110 in FIG. 2, charging of battery cell 250 is executed by 700 (mA), or stopped regardless of whether or not battery pack 200 is attached to digital video camera 100. Accordingly, the temperature of battery pack 200 does not excessively increase.

Furthermore, according to battery pack 200 in this exemplary embodiment, the structure constituted by microcomputer 210, charging circuit 220, charging coil 230, and switch 240 charges battery cell 250 by a constant current value in the CC charging period corresponding to a first period for charging battery cell 250, and charges battery cell 250 by a variable current value in such a manner as to keep a voltage of battery cell 250 constant in the CV charging period corresponding to a second period different from the first period. In addition, battery pack 200 charges battery cell 250 by the first current value for the whole or a part of the CC charging period when battery pack 200 is attached to digital video camera 100, and charges battery cell 250 by the second current value lower than the first current value when battery pack 200 is not attached to digital video camera 100. Accordingly, battery pack 200 can be charged further closer to full charge.

Other Exemplary Embodiments

The first exemplary embodiment described herein is presented by way of example of the technique disclosed in the present application. However, the technique of the present disclosure is not limited thereto, and is applicable to other exemplary embodiments to which modification, replacements, additions, omissions or the like are made.

Other exemplary embodiments are hereinafter described by way of example. According to the first exemplary embodiment, charging of battery pack 200 is executed by utilizing electromagnetic induction produced by the effect of magnetic field generated by inductive charger 300. However, the present disclosure is not necessarily limited to this structure. For example, charging may be executed by using an AC adapter connected to battery pack 200, or an AC adapter connected to digital video camera 100 to which battery pack 200 is attached.

According to the first exemplary embodiment, battery pack 200 is charged by current having a constant current value during the CC charging period. However, the present disclosure is not necessarily limited to this structure. For example, charging in the final part of the CC charging period may be executed by current having a current value lower than the current value used in the initial part of the CC charging period. For example, in the case of battery pack 200 configured so as to change the voltage value at the time of full charge in accordance with the temperature, a situation may occur in which charging up to a low voltage value is only allowed due to a temperature increase when charging is executed by current having a constant current value of 1 (A) or 700 (mA) for the entire length of the CC charging period. However, when charging in the final part of the CC charging period is executed by current having a current value lower than the current value used in the initial part of the CC charging period, the temperature of battery pack 200 does not excessively increase. Accordingly, battery cell 250 can be charged to a sufficiently high voltage value. According to the first exemplary embodiment, battery pack 200 determines whether or not the temperature of battery cell 250 is 50 (° C.) or higher, and whether or not the temperature of battery cell 250 is 70 (° C.) or higher. However, the present disclosure is not necessarily limited to this structure. For example, battery pack 200 may determine whether or not the temperature of battery cell 250 is 60 (° C.) or higher, and whether or not the temperature of battery cell 250 is 65 (° C.) or higher. In other words, battery pack 200 is only required to determine whether or not the temperature of battery cell 250 exceeds predetermined temperatures.

According to the first exemplary embodiment, the currents used by battery pack 200 for charging battery cell 250 are set to 1 (A) and 700 (mA) by way of example. However, the present disclosure is not necessarily limited to this structure. For example, the currents used by battery pack 200 for charging battery cell 250 may be 1.5 A and 1 (A), or may be 900 (mA) and 500 (mA). In other words, for the currents used by battery pack 200 for charging battery cell 250, the current having the first current value and the current having the second current value lower than the first current value may be adopted.

According to the first exemplary embodiment, the voltage at full charge of battery pack 200 is set to 4.2 (V), while the voltage of battery cell 250 at the end of the CC charging period is set to 4.1 (V). However, the present disclosure is not necessarily limited to this structure. For example, the voltage at full charge may be set to 4 (V), while the voltage of battery cell 250 at the end of the CC charging may be set to 3.8 (V). These voltage values are determined based on the characteristics, the number of battery cells 250, whether a plurality of battery cells 250 are connected in series or in parallel, for example. Thus, the voltage values may be arbitrarily determined in accordance with the characteristics of battery cell 250.

The exemplary embodiments have been described by way of example of the technique provided according to the present disclosure. For this purpose, the accompanied drawings and detailed description have been presented herein.

Accordingly, the accompanying drawings and detailed description may include not only constituent elements essential to solution of problems, but also constituent elements presented only by way of example of the technique according to the present disclosure and not essential to solution of problems. It should not be therefore concluded that these not-essential constituent elements are treated as essential constituent elements simply because the not-essential constituent elements are shown in the accompanying drawings and detailed description.

Moreover, the foregoing exemplary embodiments have been only presented by way of example of the technique provided according to the present disclosure. Accordingly, various modifications, replacements, additions, omissions and the like may be made to the exemplary embodiments without departing from the scope of the appended claims and the scope of equivalency.

The technique of the present disclosure can be applied to a storage battery device which can be attached to an electronic device such as a digital camera and a portable phone.

What is claimed is:

1. A storage battery device comprising:
   a storage unit accumulating charge;
   an attachment unit attachable to an electronic device and including a first terminal of the storage battery device electrically connected to a first terminal of the electronic device; and
   a controller charging the storage unit inductively by a first current value that does not flow through the attachment unit when the storage battery device is attached to the electronic device via the attachment unit, and charging the storage unit inductively by a second current value lower than the first current value when the storage battery device is not attached to the electronic device via the attachment unit, wherein the controller detects whether or not the storage battery device is attached to the electronic device by detecting a voltage value applied to the first terminal of the storage battery device.

2. The storage battery device according to claim 1, further comprising:
   a detector detecting a temperature of the storage unit,
   wherein when the temperature is higher than a predetermined temperature, the controller charges the storage unit inductively by a current value lower than the first current value or does not charge the storage unit inductively regardless of whether or not the storage battery device is attached to the electronic device via the attachment unit.

3. The storage battery device according to claim 1, wherein
   the controller charges the storage unit inductively by a constant current value in a constant current (CC) charging period corresponding to a first period in a period for charging the storage unit, and charges the storage unit inductively by a variable current value in such a manner as to keep a voltage of the storage unit constant in a constant voltage (CV) charging period corresponding to a second period different from the first period, and
   a part of the period for charging the storage unit corresponds to a whole or a part of the constant current (CC) charging period.

4. The storage battery device according to claim 1, wherein the controller charges the storage unit inductively by the first current value or the second current value in a part of the period for charging the storage unit.

5. The storage battery device according to claim 1, wherein the attachment unit includes second and third terminals of the storage battery device electrically connected to a second and third terminals, respectively, of the electronic device.

6. The storage battery device according to claim 1, wherein the attachment unit includes, in addition to the first terminal of the storage battery device, positive and negative terminals of the storage battery device electrically connected to positive and negative terminals, respectively, of the electronic device.

* * * * *